United States Patent Office 3,507,147
Patented Apr. 21, 1970

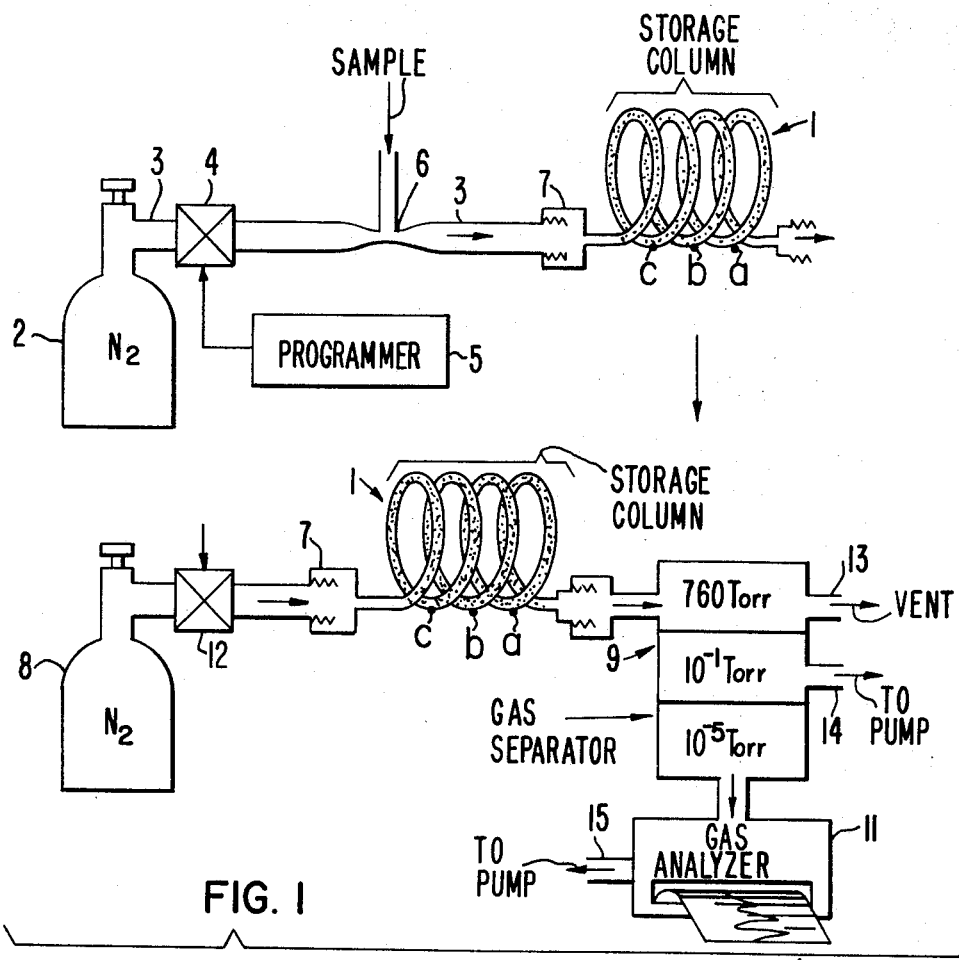
FIG. 1
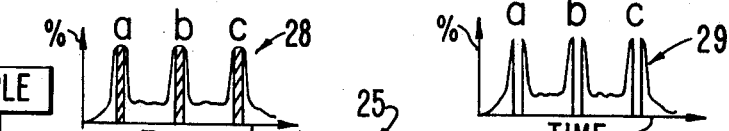
FIG. 2
INVENTOR
PETER M. LLEWELLYN
BY Wm. I. Nolan
ATTORNEY
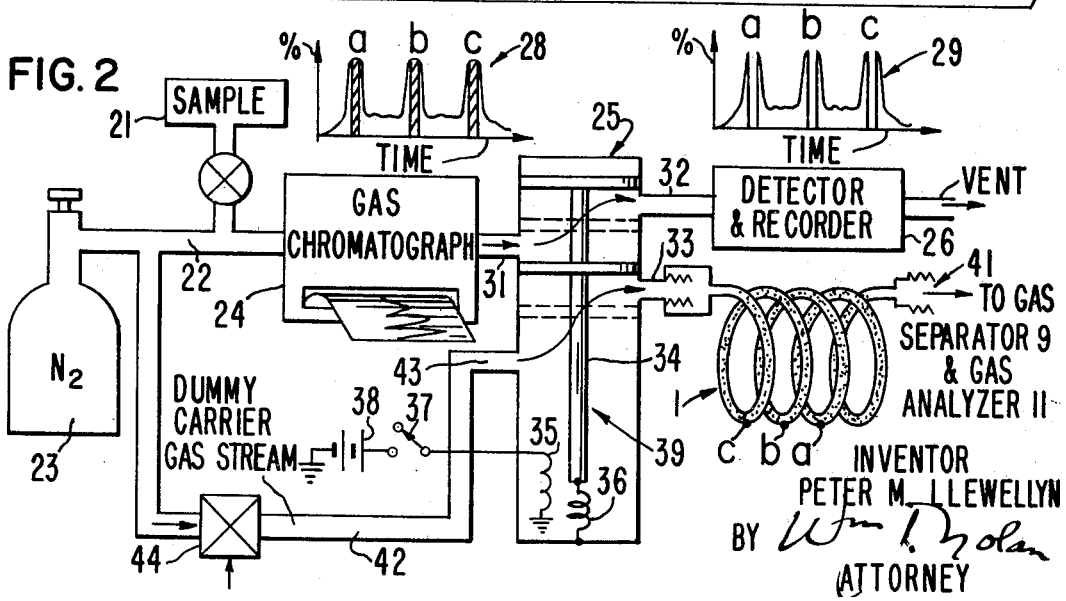

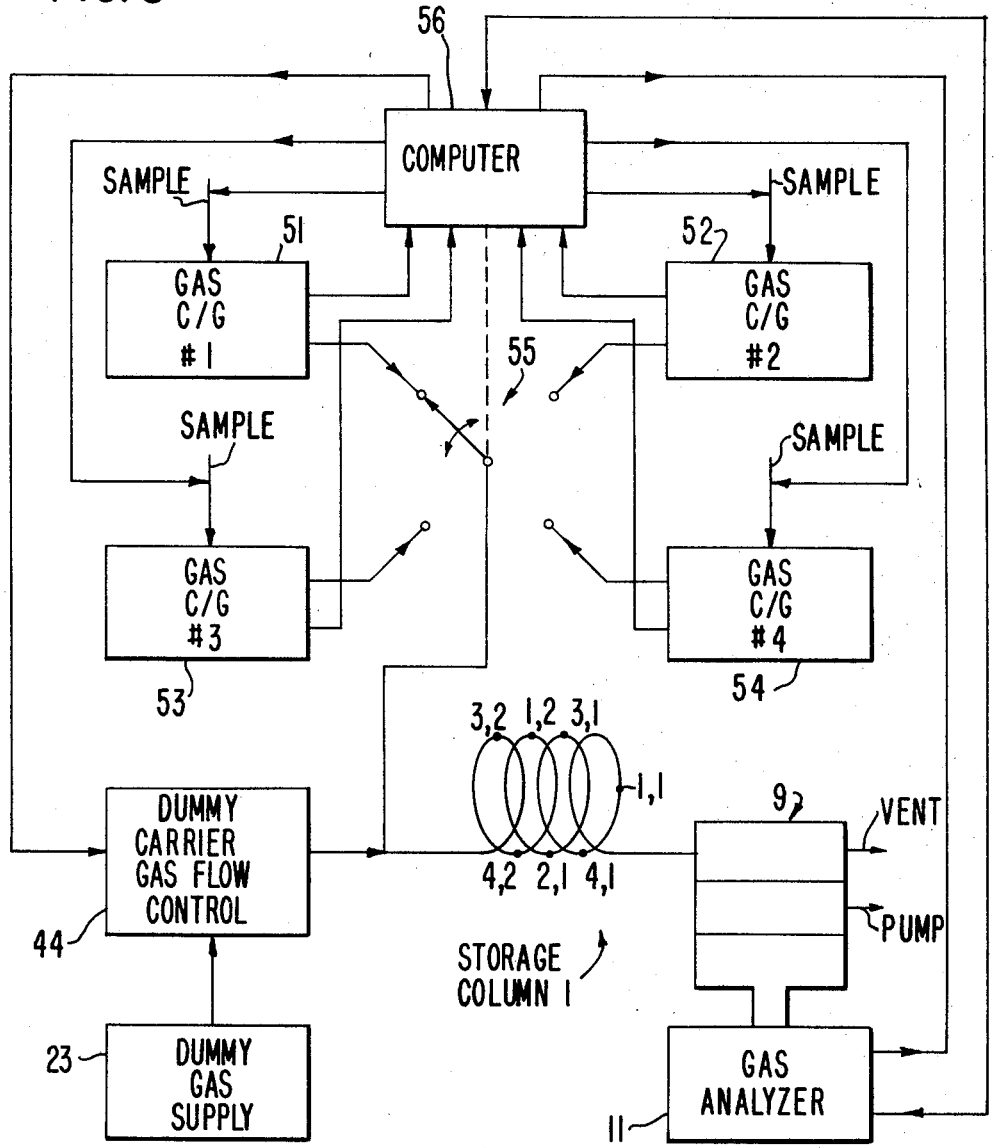

3,507,147
SAMPLE INLET METHOD AND APPARATUS FOR GAS ANALYZERS EMPLOYING A STORAGE COLUMN AND GAS SEPARATOR
Peter M. Llewellyn, Menlo Park, Calif., assignor to Varian Associates, Palo Alto, Calif., a corporation of California
Filed Aug. 21, 1967, Ser. No. 661,869
Int. Cl. G01n 31/08, 1/22
U.S. Cl. 73—23.1                 9 Claims

ABSTRACT OF THE DISCLOSURE

Sample inlet systems for gas analyzers are disclosed. The sample inlet system includes a storage column which may comprise, for example, a long length of small diameter tubing or a relatively short length of tubing packed with a liquid phase substrate material such as diatomaceous earth covered with liquid phase material such as wax or silicone. The body of gas to be sampled such as, for example, the earth's atmosphere or the fluid stream from a gas chromatograph is periodically sampled and the samples are pushed into the storage column by a carrier gas stream of permanent gas. Once the sample is inside the storage column the carrier gas stream is interrupted. The sample is then effectively stored in the column since the diffusion rate for diffusion of the gas sample out of the column is on the order of 10 cms. per day for a liquid phase packed column; thus, the sample may be stored in the column for days. Subsequent samples may also be stored in the column in a similar manner. Thus, various samples are stacked in the storage column and a number of such samples may be stored in the column. The storage column may be removed from the gas sampling device and transported to a remote station for gas analysis at a remote station. Successive ones of the stored samples are pushed through the storage column by connecting the storage column to a stream of carrier gas. As the various samples are pushed out of the storage column they are passed through a gas separator which separates gas to be analyzed from the permanent gases and feeds the gas to be analyzed to a mass spectrometer or other gas analyzer. The flow rate of the second carrier gas stream through the storage column may be adjusted as desired to optimize gas analysis.

In one preferred embodiment of the present invention, various fractions in the effluent stream of a gas chromatograph are periodically switched via a gas switch into the storage column for storage therein. The stored fractions are subsequently analyzed by pushing the stored fractions through the storage column to a gas separator and into a mass spectrometer.

In another preferred embodiment of the present invention, a plurality of gas chromatographs are connected to a storage column via the intermediary of a gas transfer switch which may be operated via a computer which selects the various fractions of the outputs of the various gas chromatographs to be sampled and stored in the storage column. The computer keeps track of the various fractions as stored in the storage column and controls a carrier gas flow which pushes the samples through the storage column to the gas separator and gas analyzer to obtain sequential analyses thereof.

DESCRIPTION OF THE PRIOR ART

Heretofore it has been proposed to utilize a packed column for storing an output fraction of a gas chromatograph for subsequent gas analysis via a mass spectrometer. Such a system is proposed in an article titled "A General Technique for Collecting Gas Chromatographic Fractions for Introduction Into the Mass Spectrometer," 13th Annual Conference on Mass Spectrometry and Allied Topics, May 16–21, 1965, pp. 493–495. In this prior arrangement the length of packed column in which the sample is to be stored in very short—on the order of a quarter inch. Due to its very short length the column is sealed on both ends to capture the material to be analyzed inside the column. The column is then transported to a mass spectrometer and inserted into the ion source region thereof through a vacuum lock. Before inserting the short section of storage column into the mass spectrometer, the column is severed to form a capillary and, once inside the mass spectrometer, the capillary is heated in order to evolve the sample from the capillary into the ion source. This method of storing and introducing samples into the mass spectrometer has several disadvantages. One of the disadvantages is that the storage column stores only one sample and needs to be sealed at the end. A second disadvantage is that in order to introduce this sample into the mass spectrometer it must be inserted through a vacuum lock. Whenever a sample is inserted through a vacuum lock system, a certain risk exists that the operator will make a mistake and cause the mass spectrometer system to be flooded with air, which necessitates baking and pumping of the mass spectrometer for a substantial period of time before the sample may be analyzed.

In another prior art sample inlet system for gas analyzers, it has been proposed to introduce the sample gas to be analyzed into a carrier gas stream which carries the sample to a gas separator. The gas separator separates the gas to be analyzed from the carrier gas. A mass spectrometer is connected to the output of the gas separator for analyzing the sample gas output of the separator. Such a gas inlet system is described and claimed in copending U.S. application 660,458 filed Aug. 14, 1967 and assigned to the same assignee as the present invention. It has also been proposed in this prior art that the output strea mof a gas chromatograph which contains various sample fraction could be fed to the gas separator for separating the fractions from the fluid carrier gas stream. The separated fractions are fed to a mass spectrometer for analysis. However, one of the problems associated with analyzing the fractional output of the gas chromatograph is that a first and second fractional output, which it may be desired to analyze, may occur in the output of the gas chromatograph with very close time spacing, for example, on the order of a second or two. Typically, the mass spectrometer yields maximum resolution if it is provided with several minutes to analyze a given peak. Therefore, less than optimum resolution is obtainable if the mass spectrometer is required to analyze two peaks within a few seconds.

SUMMARY OF THE PRESENT INVENTION

The principal object of the present invention is the provision of an improved inlet system for gas analyzers.

One feature of the present invention is the provision, in a gas inlet system for gas analyzers, of a storage column in combination with a gas separator, whereby samples to be analyzed may be periodically stored in the storage column and subsequently pushed, at a controlled rate, from the storage column via a carrier gas stream through the gas separator and into the gas analyzer for analysis.

Another feature of the present invention is the same as the preceding including the combination of a gas chromatograph, the output of which is to be sampled, and means for periodically diverting portions of the effluent gas stream of the gas chromatograph into the storage column for storage therein, whereby the output fractions of the gas chromatograph may be subsequently analyzed.

Another feature of the present invention is the same as any one or more of the preceding features wherein the storage column is sequentially connected to the outputs of a plurality of gas chromatographs whereby the outputs of of a plurality of gas chromatographs may be stored for subsequent analysis by a gas analyzer.

Another feature of the present invention is the same as the preceding feature including the provision of a computer, for controlling the storage of the samples in the storage column, for controlling the positions of the samples within the storage column and for controlling the rate at which the various samples are analyzed by the gas analyzer, whereby an automated sample analysis system is obtained.

Other features and advantages of the present invention will become apparent on a perusal of the following specification taken in connection with the accompanying drawings wherein:

BRIEF DESCRIPTION OF THE DRAWINGS

FIG. 1 is a schematic diagram, partly in block diagram form, depicting the sample storage and analysis steps of the present invention, FIG. 2 is a schematic diagram of a gas analysis system employing a gas chromatograph and a storage column of the present invention, and FIG. 3 is a schematic block diagram of a gas analysis system employing a plurality of gas chromatographs and a computer for controlling storage of samples for subsequent analysis by a gas analyzer.

DESCRIPTION OF THE PREFERRED EMBODIMENTS

Referring now to FIG. 1, there is shown the method and apparatus for analyzing gases according to the present invention. A body of gas which is desired to analyze, for example, the earth's atmosphere is periodically sampled by being periodically injected into a carrier gas stream which is directed to a storage column 1. A source 2 of permanent carrier gas such as a bottle of nitrogen gas is connected into a conduit 3 to contain a stream of carrier gas in the conduit 3. A control valve 4 is provided in the conduit 3 for controlling the flow of the carrier gas stream in accordance with the output of the programmer 5. A venturi 6 is provided in the conduit 3 such that when the carrier gas stream is flowing through the conduit 3, the venturi 6 injects a sample of the atmosphere into the carrier gas stream. The carrier gas stream carries the injected sample of gas into the storage column 1.

The storage column 1 preferably contains a packing of a porous substrate material having a liquid phase thereon which will dissolve the constituents of the atmosphere to be analyzed while not substantially dissolving the carrier gases. A suitable storage column comprises a length of ⅛" stainless steel tubing, packed with a suitable liquid phase substrate packing material such as that typically used in packed gas chromatograph columns; for example, diatomaceous earth covered with a liquid phase such as wax or silicone may be used. As is well known, the packing material and liquid phase are preferably selected for the particular gaseous constituents to be analyzed. The packed column 1 is preferably longer than one foot. The storage column 1 need not be packed but may comprise merely a relatively long length of tubing such as, for example, a 50 foot length of ⅛" stainless steel tubing.

In the case of the packed storage column 1, the gaseous constituents of the atmosphere to be analyzed go into solution with the liquid phase of the packing material and move through the column 1 at a rate much slower than the rate at which the carrier gas moves through the column. When the carrier gas stream is interrupted by the programmer 5 and valve 4, the sample constituent remains in a relatively fixed position within the storage column 1. More particularly, a typical diffusion rate would be approximately 1 centimeter per day for the packed column in the absence of the carrier gas stream flowing therethrough. Thus the programmer 5 causes periodic opening of the valve 4 to periodically inject samples into the column 1 in successive order. The samples $a$, $b$, $c$, stored in the column 1 move through the column in the order in which they are stacked therein by the interrupted carrier gas stream. For example, the programmer 5 may be pre-programmed to sample the atmosphere once per hour or upon the occurrence of some event such as, for example, an indication of a monitoring device that a certain constituent in the atmosphere has reached a certain level in parts per million. Storage column 1 with the samples stored therein is decoupled from the conduit 3 via coupler 7 and transported to a remote station for gas analysis as indicated in the second step of the drawing. Storage column 1 is then connected between a second source of permanent gas 8 and a gas separator 9. A gas analyzer 11 is connected to the output of the gas separator 9 for analyzing the various constituents of the gas samples. An adjustable flow control valve 12 is provided in the conduit upstream of the storage column 1 for controlling the flow rate of the carrier gas through the storage column.

The carrier gas stream pushes the stored samples $a$, $b$, and $c$ through the storage column to the gas separator 9. The gas separator 9 is preferably of the membrane type which serves to extract the sample material from the carrier gas by causing the sample material to go into solution with the membrane material and diffuse through the membrane whereas the carrier gases are not dissolved in the membrane material and are exhausted via vent 13. Membrane separator 9 preferably includes at least two stages to obtain an enrichment of the sample material by a factor of approximately a million. The region between the membranes is operated at a suitable pressure, for example, $10^{-1}$ torr, and is exhausted by exhaust tubulation 14 and a pump, not shown. The second membrane serves to provide a second stage of sample enrichment and the downstream side of the second membrane is operated at the input pressure to the gas analyzer, for example $10^{-5}$ torr. A suitable gas analyzer, is for example, a mass spectrometer of the magnetic sector or double focusing cyclotron type which is exhausted to a suitable pressure as of, for example, $10^{-6}$ torr via exhaust tubulation 15 and a pump, not shown.

One advantage of the storage column 1 is that a plurality of different samples may be stored in the column for subsequent analysis by a suitable gas analyzer system. This means that a plurality of sampling stations which each comprise merely a bottle of gas, a control valve, and a storage column may be employed for taking samples and a separate gas analyzer need not be provided for each sample station. Periodically, for example, once every day, the storage column 1 may be removed from the sampling station and taken to a central gas analysis station for analysis.

At the gas analysis station, one gas analyzer 11 can be employed for examining the sample gases stored in a plurality of storage columns 1. In addition, the flow rate of the carrier gas stream may be controlled for pushing the samples through the storage column 1 into the gas analyzer 11 at rates which will provide optimum resolution for the gas analyzer and which rate is typically different than the rate at which the samples are extracted at the sampling station.

Referring now to FIG. 2, there is shown a storage column 1 as employed with a gas chromatograph for storing various effluent fractions of the gas chromatograph. More specifically, a sample to be analyzed 21 is injected into a carrier gas stream flowing within an input conduit 22 from a source of permanent carrier gas 23 through a gas chromatograph 24. The output gas stream of the gas chromatograph 24 is fed via a gas transfer valve 25 to either a detector and a recorder 26 or to the storage column 1 as determined by the setting of the gas transfer valve 25.

In the gas chromatograph 24, the sample 21 is separated into its various constituents according to the rate at which the constituents can move through the partitioning column of the gas chromatograph, not shown. Thus, the output of the gas chromatograph 24 includes the various different constituents of the sample which peak up in percentage of the gas stream in a time-displaced manner, one peak for each of the different constituents as indicated by the chromatogram 28. Typically, the operator is only interested in analyzing one or two of the peaks since he typically knows that certain of the peaks are associated with solvents used to dissolve the sample material, etc. Accordingly, when the output of the gas chromatograph 24 includes a sample peak which he desires to analyze, he actuates the gas transfer valve 25 to divert the flow of the gas chromatograph 24 into the storage column 1. Assuming, for the sake of explanation, that the operator decides to sample peaks *a*, *b*, and *c*, these samples will be stored in the column 1 as indicated by letters *a*, *b*, and *c*. The undiverted portion of the output of the gas stream of the gas chromatograph passes through the gas transfer valve 25 to the detector and recorder 26 which serves to detect and record a chromatogram of the output of the gas chromatograph minus the sample portions which are stored in the storage column 1. Such a chromatogram is indicated at 28. A suitable gas transfer valve 25 includes an input port 31 and two output ports 32 and 33 with an axially translatable shuttle 34. The shuttle 34 may be made of a magnetic material and moved axially in response to a magnetic field produced by solenoid 35. The shuttle 34 is spring-biased via spring 36 to a position which connects the input port 31 to the output port 32. A switch 37, connected in circuit between the solenoid 35 and a battery 38, serves to selectively energize the solenoid 35 for diverting the output from port 32 to port 33. A gas transfer valve 25 of this type is described and claimed in copending U.S. patent application 626,193 filed Mar. 27, 1967, now abandoned and assigned to the same assignee as the present invention.

The advantage of the gas analyzer system of FIG. 2 is that the successive fractional outputs of the gas chromatograph 24 may be stored in the storage column 1 for subsequent analysis via a gas analyzer at a remote location in the manner as previously described with regard to FIG. 1. At the remote location, the carrier gas flow rate through the storage column 1 may be selected to provide optimum analysis of the gaseous constituents stored in the column. Typically, this flow rate will be much lower than the flow rate obtained in the output of the gas chromatograph 24. Therefore, the storage column 1 permits the operator to obtain enhanced resolution of the gas to be analyzed.

As an alternative to removing the storage column and taking it to a remote location for analysis of the gas, the storage column may be left connected to the gas chromatograph via the transfer valve 25 and a gas separator 9 and gas analyzer 11 connected to the output 41 of the storage column 1. In this case a dummy carrier gas stream is derived from the carrier gas source 23 via a second conduit 42 which is connected into the gas transfer valve 25 at a second input port 43. When the shuttle 34 is in the position to pass the output of the gas chromatograph 24 to the detector and the recorder 26, a dummy carrier gas stream, entering at port 43, passes into the storage column 1 for pushing the stored samples through the storage column to the gas separator 9 and gas analyzer 11 at a rate as determined by a control valve 44 connected in the dummy carrier gas conduit 42.

Referring now to FIG. 3, there is shown a gas sampling and analyzing system employing a plurality of gas chromatographs. More specifically, a plurality of gas chromatographs 51, 52, 53 and 54 feed their output gas streams to a gas transfer valve 55 which can select, at any one time, any one of the outputs of the gas chromatographs 51–54 for connection to the input of the storage column 1. The output of the storage column 1 is fed via a gas separator 9 to a gas analyzer 11 for analysis of the gas samples stored in the storage column 1. A dummy carrier gas supply 23 supplies a carrier gas stream through the storage column 1 to the gas separator 9 and analyzer 11.

A pre-programmed computer 56 controls the introduction of sample materials into the various gas chromatographs 51–54 and monitors the outputs of the gas chromatographs. The computer 56 cause the gas transfer valve 55 to periodically sample the outputs of various ones of the gas chromatographs 51–54 and to cause the samples to be stored in the storage column 1. The computer identifies each of the various samples according to the gas chromatograph from which it emanated; for example, 2, 1 indicates the first sample from the second chromatograph. The computer controls the dummy carrier gas flow rate through the storage column to control the rate at which the stored samples are analyzed by the gas analyzer 11. The computer 56, using the flow rate through the storage column 1, tracks the position of the various samples 1, 1, 3, 1, 4, 1, etc. stored in the storage column and correlates the output of the gas analyzer 11 with the peaks as stored in the storage column 1 such that, for example, the output mass spectra of the peaks being analyzed by the gas analyzer are properly identified in the output of the computer 56 which reads out the mass spectra.

The advantage of the system of FIG. 3 is that the analysis of samples from a number of gas chromatographs is substantially automated.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gas analyzer system, means for sampling a source of gas to be analyzed to obtain at least first and second gas samples, means forming a gas column for storing the gas samples, means for periodically flowing the gas samples into said gas column for storing same therein, means forming a gas separator for separating permanent gases from sample gases, means forming a gas analyzer connected to analyze sample gas outputs of said gas separator, the improvement comprising, a carrier gas source for directing a stream of carrier gas through said storage column and into said gas separator to push a stored sample of gas into said gas separator means for separating same and providing samples to said gas analyzer means and flow control means for controlling the rate of flow of gas from said carrier gas source independently of the rate of flow of said periodic flow means.

2. The apparatus of claim 1 wherein said gas storage column comprises a length of tubing packed with a liquid phase substrate material.

3. The apparatus of claim 1 wherein said gas column comprises a relatively long length of tubing.

4. The apparatus of claim 1 wherein the source of gas to be analyzed is the output gas stream of a gas chromatograph, and wherein said means for periodically sampling the source of gas to be analyzed includes a gas transfer valve connected for periodically disconnecting said carrier gas source from said storage column and simultaneously diverting at least a portion of the effluent gas flow of said gas chromatograph into said gas storage column.

5. The apparatus according to claim 4 wherein said flow control means provides a flow rate substantially less than the flow rate of the output gas stream of said gas chromatograph, whereby the stored gas samples are pushed through said storage column to said gas analyzer at a slower rate than they are supplied at the output of said gas chromatograph.

6. The apparatus of claim 1 including, means forming a computer for causing said sampling means to periodically sample the body of gas to be analyzed, and said computer means tracking the position of the samples stored in said storage column for correlating the output of said gas analyzer with the stored samples.

7. The apparatus of claim 6 wherein said flow control means comprises a variable flow control valve and wherein said computer means controls said control valve to control the flow rate of the carrier gas through said storage column.

8. The method for handling gases to be analyzed comprising the steps of, periodically withdrawing from a body of gas a plurality of samples of gas to be analyzed, periodically flowing the gas samples into a storage column for storage therein such that said samples are physically positioned within said storage column in the order in which they were withdrawn from said body of gas, flowing the sample gases sequentially out of the storage column to a gas separator for separating the sample gases to be analyzed from permanent gases, if any, flowing into the gas separator, and flowing the separated sample gases into a gas analyzer for analysis thereof.

9. The method of claim 8 wherein the body of gas to be analyzed is the output gas stream of a gas chromatograph having the sample carried in a carrier gas stream, and including the step of monitoring the sample gas constituents in the output carrier gas stream of the gas chromatograph, and wherein the steps of periodically withdrawing a sample of gas from the body of gas and periodically flowing the gas samples into a storage column comprises the steps of periodically diverting a portion of the output stream of the gas chromatograph in accordance with the monitored output, and passing the diverted gas stream into the storage column.

References Cited

UNITED STATES PATENTS

| | | | |
|---|---|---|---|
| 3,356,458 | 12/1967 | Steink et al. | 55—197 |
| 3,201,971 | 8/1965 | Villalobos | 73—23.1 |
| 3,301,040 | 1/1967 | Villalobos | 73—23.1 |
| 3,316,751 | 5/1967 | Burk | 73—23.1 |
| 3,429,105 | 2/1969 | Llewellyn et al. | 73—23.1 |
| 3,430,417 | 3/1969 | Creo | 73—23.1 X |

RICHARD C. QUEISSER, Primary Examiner

E. J. KOCH, Assistant Examiner

U.S. Cl. X.R.

73—421.5